United States Patent [19]

Fleming et al.

[11] 4,118,646

[45] Oct. 3, 1978

[54] ELECTROMAGNETIC MACHINES

[75] Inventors: Francis William Fleming; Raymond John Pethick, both of Glasgow, Great Britain

[73] Assignee: Markon Engineering Company Limited, Nottingham, Great Britain

[21] Appl. No.: 807,882

[22] Filed: Jun. 17, 1977

Related U.S. Application Data

[63] Continuation of Ser. No. 600,198, Jul. 29, 1975, abandoned.

[51] Int. Cl.² .............................................. H02K 9/00
[52] U.S. Cl. ....................................... 310/58; 310/62; 310/269; 165/86; 165/105
[58] Field of Search .................... 310/52, 54, 59, 58, 310/61, 62, 63, 64, 269; 165/86, 105

[56] References Cited

U.S. PATENT DOCUMENTS

| 1,739,137 | 12/1929 | Gay | 310/52 |
| 2,722,616 | 11/1955 | Moses | 310/64 |
| 2,899,573 | 8/1959 | Wesolowski | 310/269 |
| 3,480,810 | 11/1969 | Potter | 310/269 |
| 3,801,843 | 4/1974 | Corman | 310/52 |
| 3,882,335 | 5/1975 | Fries | 310/62 |
| 3,914,630 | 10/1975 | Lloyd | 310/62 |

Primary Examiner—R. Skudy
Attorney, Agent, or Firm—Mason, Fenwick & Lawrence

[57] ABSTRACT

An electromagnetic machine having a salient pole rotor, impellor means for directing a flow of coolant gas through the machine, an electrically conductive winding carried on each salient pole of the rotor, and a heat pipe structure carried by each such winding positioned with the evaporator end of each heat pipe structure embedded within the associated winding the condenser end projecting out of the winding into the path of flow of the coolant gas and the portions of the heat pipe structure between the ends extending literally across a plurality of the conductors of the associated winding.

4 Claims, 10 Drawing Figures

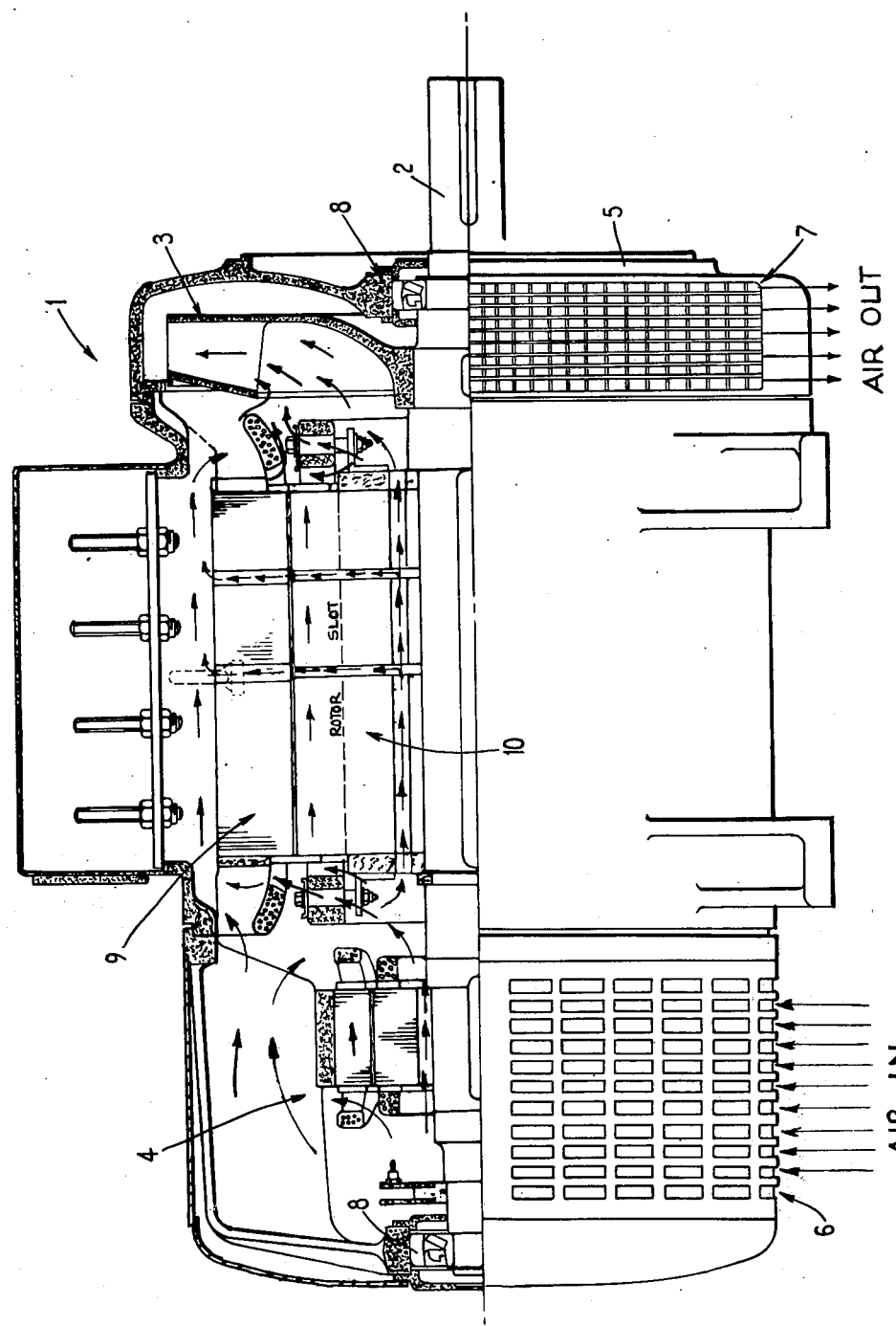

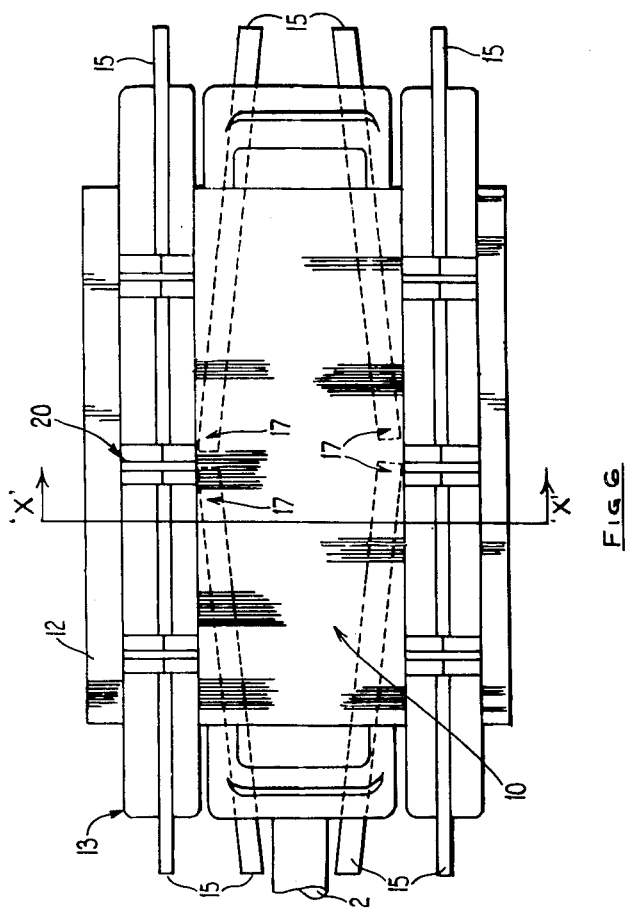
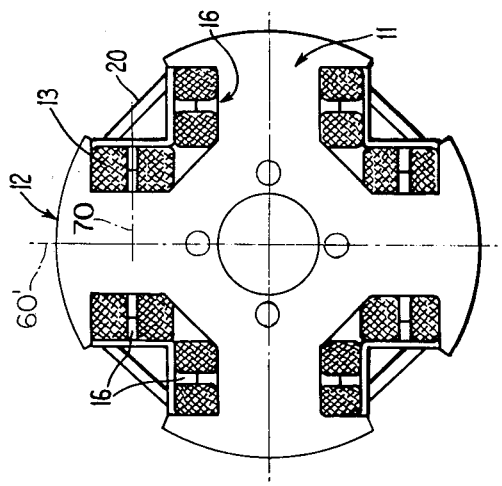

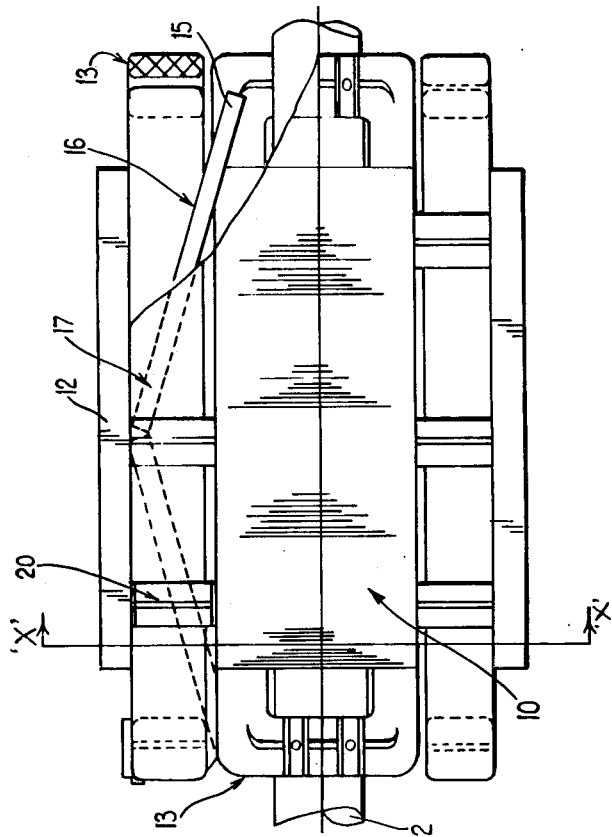
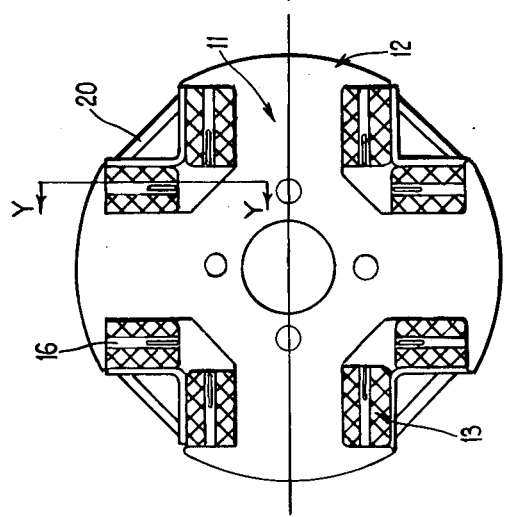

ELECTROMAGNETIC MACHINES

This is a continuation of application Ser. No. 600,198, filed July 29, 1975, now abandoned.

This invention relates to electromagnetic machines having salient pole rotors.

Hitherto in the manufacture of such machines the rotor which has been made of iron, either solid or laminated, has been shaped to permit cooling of the salient pole windings partly by convection to the surrounding atmosphere and partly by conduction through the iron but this has imposed a limitation on the electrical rating of the machine. The rotor, for example, has been axially apertured to provide surfaces which act as cooling surfaces but which play no part in the electromagnetic performance of the machine. To assist cooling the rotor has been provided with an impellor blade at one end and the entire machine housing has been arranged to permit an axial flow of cooling air.

The problem in cooling such salient pole rotors lies in the fact that the pole windings are not distributed in any way around the exposed periphery of the rotor but, on the contrary, are tightly compacted around the poles in order to achieve maximum efficiency in the production of the field magnetomotive force.

It is an object of the present invention to provide an improved form of electromagnetic machine of the salient pole rotor type.

According to the present invention there is provided an electromagnetic machine having a salient pole rotor, impellor means for directing a flow of coolant gas through the machine, an electrically-conductive winding carried on each salient pole of the rotor and a heat pipe structure carried by each said winding, each heat pipe structure being positioned with its evaporator end within the pertaining winding and its condenser end projecting out of the pertaining winding and into the path of flow of said coolant gas.

The heat pipe structure may consist of a single element or of a plurality of similar elements each of which has an evaporator end and a condenser end. Alternatively, the structure may incorporate a single evaporator end intermediate a pair of condenser ends. Reference is made to an article entitled "Heat Pipes" published February, 1974 in the publication "Electronics Today International."

Embodiments of the present invention will now be described by way of example with reference to the accompanying drawings, wherein:

FIG. 1 is a partially cross-sectional view of a salient pole electromagnetic machine wherein the coolant air flow paths are illustrated;

FIGS. 5 and 6 illustrate a second embodiment of the present invention, FIG. 5 being a sectional view on the line X—X of FIG. 6;

FIGS. 9 and 10 illustrate a fourth embodiment of the present invention, FIG. 9 being a sectional view on the line X—X of FIG. 10 and FIG. 10 being a sectional view (partly cut away in the interests of clarity) on the line Y—Y of FIG. 9.

Figure 3:
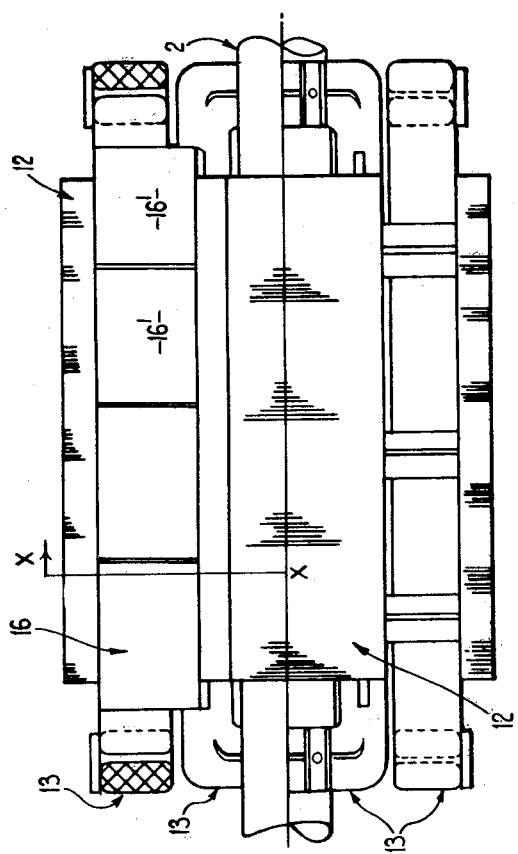
FIGS. 2, 3 and 4 illustrate a first embodiment of the present invention, FIG. 4 being an enlarged view of part of FIG. 2, FIG. 2 being a sectional view on the line X—X of FIG. 3 and FIG. 3 being a sectional view on the line Y—Y of FIG. 2.

A salient pole rotor electromagnetic machine 1 is shown in FIG. 1 and comprises a shaft 2 carrying a laminated rotor 10 which is associated with a laminated stator 9. At the opposite ends the shaft 2 carries an impellor 3 and a field exciter 4 and is mounted on bearings 8 within a casing 5 provided with air-flow grills 6, 7. In operation, the arrangement is such that air is drawn in the grill 6 and axially along the rotor 10 between adjacent piles thereof and is ejected from the casing 5 through the grill 7. As illustrated, at two points axially along this particular rotor 10 (and stator 9) the laminations are omitted to provide ducts for the passage of air therethrough; it will, however, be appreciated that any number of such passageways may be provided.

Figure 2:
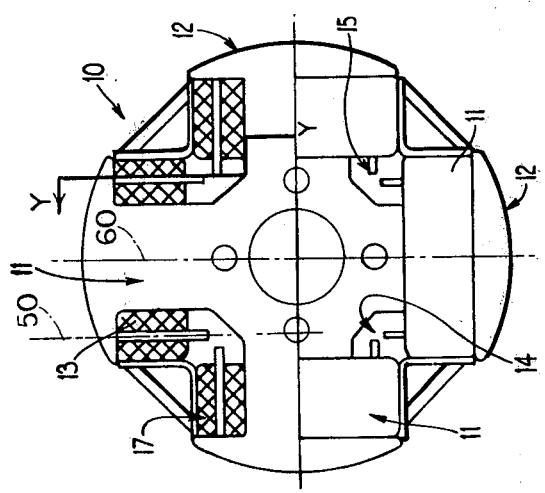
Figure 4:
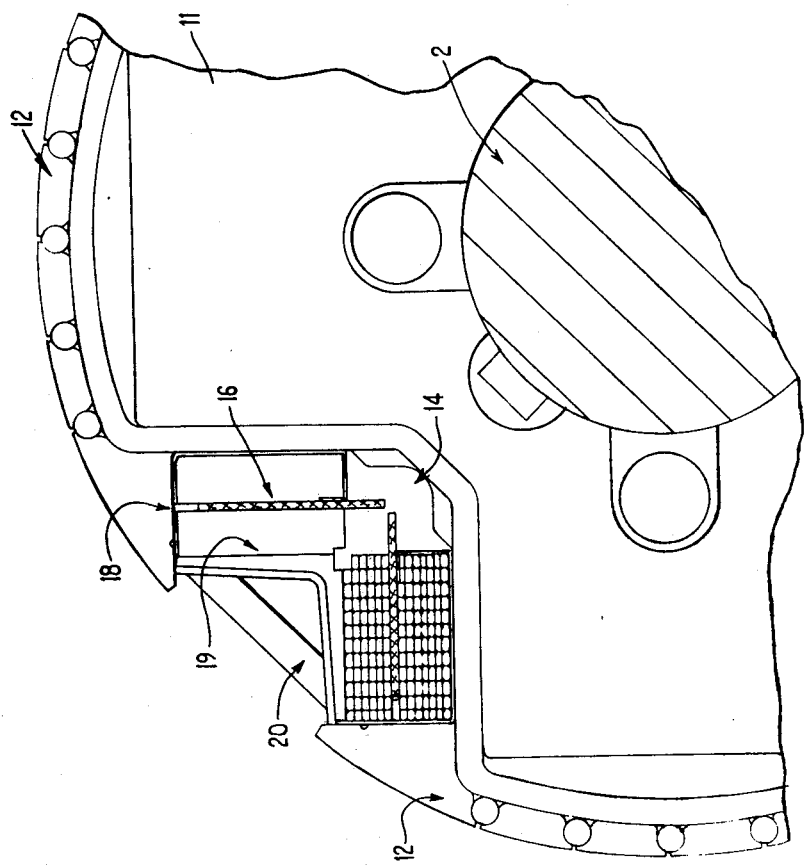

Various rotors 10, modified in accordance with the present invention will now be described in detail. Typically, as shown in FIG. 2 the rotor 10 has four poles 11 each having a pole shoe 12 and a pole winding 13 and as can be seen a longitudinally-extending space 14 is formed between adjacent windings 13 along which coolant air passes. In accordance with the present invention a heat pipe structure 16 is mounted on the rotor 10 in such a manner as to assist in the removal of heat from within the windings 13. Heat pipes, as is well known, operate under capillary action and have an evaporator end 17 and a condenser end 15. In the present invention the evaporator end 17 of the structure 16 is housed within the winding 13 and the condenser end 15 is arranged to project into a stream of coolant air. In the embodiment of FIGS. 2, 3 and 4 the condenser end 15 extends into the space 14 whilst the evaporator end 17 is located adjacent the pole shoe 12. This is achieved by forming the structure 16 from a plurality of laterally abutting elements 16' each of which has an evaporator end 17 and a condenser end 15, the elements 16' being of equal thickness to the rectangular-section strip material forming the winding 13 so that during the formation of the winding 13, for example, as indicated in FIG. 4, after seven layers of the winding 13 have been positioned the elements 16' are inserted together with an insulation packing piece 18 and a further six layers of the winding 13 are formed. Thereafter additional insulation 19 is provided between the windings of adjacent poles 11 and triangular shaped wedging elements 20 pressed into position beneath the overhang of the pole shoes 12 whereby the winding 13 and the heat pipe structure is retained firmly in place. By virtue of the fact that the structure 16 closely abuts the winding 13, being separated from the actual current carrying conductors merely by the coating of electrically insulating varnish or the like which is present on these conductors, good heat transfer is achieved from the winding 13 to the structure 16.

In the embodiment of FIGS. 2, 3 and 4 each pole 11 carries two structures 16 but it will be appreciated that additional structures 16 may be provided in the windings 13. It will be noted that the ends 15 of adjacent structures 16 are located within the air space 14 and the separation of these ends 15 may be altered by altering the location of the structures 16 within the various layers of conductors which form the winding 13. It will also be appreciated that in each structure 16 the evaporator end 17 is more remote from the shaft 2 than is the condenser end 15 and this permits the effect of centrifugal forces to be used to advantage in assisting the conventional operation of the heat pipe structure. Thus, the condensed coolant within the structure 16 is forced by centrifugal action to move by capillary action towards the evaporator end 17 of the structure 16.

As can be seen in FIGS. 2 & 3, the structure 16 is in a plane 50 which is parallel to the axially-extending medial plane 60 of the pertaining salient pole.

FIGS. 5 and 6 are similar to FIGS. 2 and 3 but they illustrate a second embodiment wherein the heat pipe structure 16 is orientated longitudinally of the rotor 10, that is, with its evaporator end 17 axially displaced from its condenser end 15 which as can be seen in FIG. 5 is located adjacent the ends of the numerous coils which together form each winding 13. In this embodiment, the evaporator end 17 is more remote from the axis of rotation of the rotor 10 than is the condenser end 15 of the structure 16 and each pole 11 carries four structures 16.

As can be seen in FIGS. 5 & 6, the structure 16 is in a plane 70 which is perpendicular to the axially-extending medial plane 60' of the pertaining salient pole.

Figure 8:
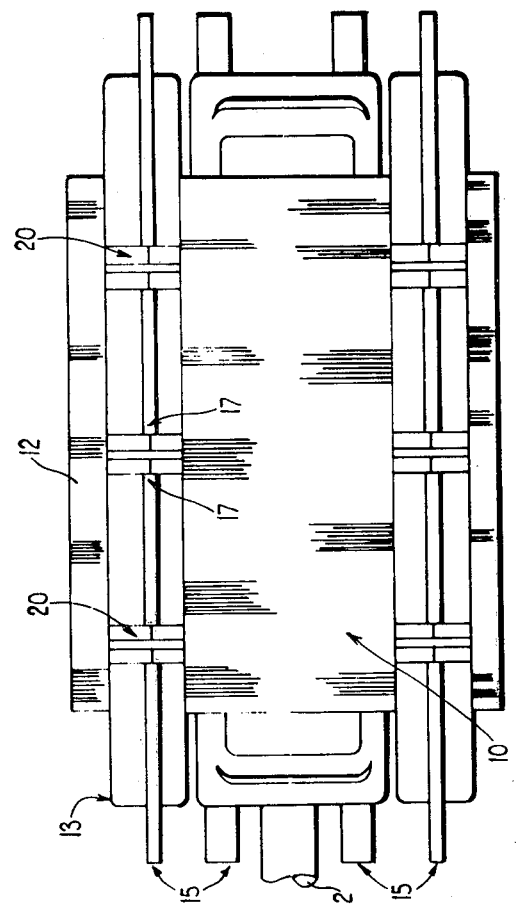
FIGS. 7 and 8 illustrate a third embodiment of the present invention.
Figure 7:
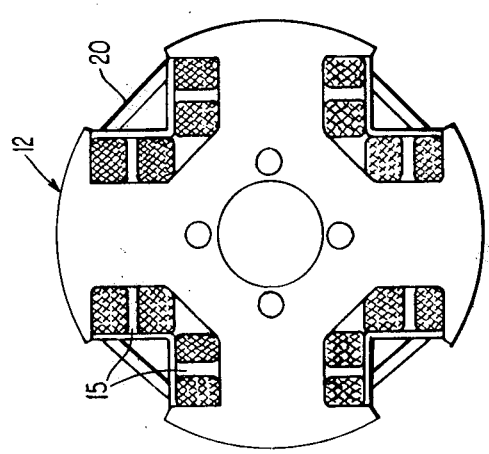

A third embodiment is illustrated in FIGS. 7 and 8 wherein two back-to-back structures 16 are provided on each coil side and the evaporator ends 17 of the structures 16 are centrally positioned, the condenser ends 15 of the structures 16 extending axially beyond the windings 13 of the rotor. Alternatively, a single long heat pipe structure may be used occupying the same position as the two back-to-back structures 16. In this case the structure has its evaporator end centrally located between two condenser ends which extend axially beyond the windings 13 of the rotor into a space through which coolant air passes. In this case there would be two structures 16 for each pole 11.

In FIGS. 9 and 10 a further embodiment is illustrated in which each pole 11 carries four heat pipes structures 16 each extending longitudinally of the rotor with the evaporator end 17 at a greater radial distance from the rotor axis than the condenser end 15.

Although the foregoing embodiments illustrate a rotor with four poles any number of pole pairs may be utilised and the electromagnetic machine may be arranged to operate either in a generating or in a motoring mode with the rotor rotating either clockwise or anticlockwise. The rotor may be completely laminated or may be substantially solid but with laminated pole shoes which are held in place by bolts. The heat pipe structure 16 may be in the form of a single element having both evaporator and condenser ends or the structure 16 may incorporate a plurality of such elements arranged contiguously in parallel. Alternatively, the structure 16 may be formed with an evaporator end centrally located between a pair of condenser ends. The structure 16 preferably has physical dimensions which are dictated by the dimensions of the material forming the pole winding and for example is of rectilinear cross-section to enable intimate contact with the winding components. To improve the transfer of heat to the cooling air fins may be fitted at the condenser ends of the heat pipes in order to increase the surface area thereof which is exposed to the flow of cooling air.

By virtue of the present invention we have provided an improved electromagnetic machine with a salient pole rotor and by virtue of the heat transfer efficiency of the heat pipe structure it is possible to operate the rotor pole windings at higher electrical loading than hitherto. The reduction in coil turns in each winding due to the presence of the heat pipe structure is believed to be less than the benefit achieved by the increased loading and consequently a nett increase in field magnetomotive force can be achieved.

We claim:

1. An electromagnetic machine comprising a salient pole rotor, impellor means for directing a flow of coolant gas through the machine, an electrically-conductive winding carried on each salient pole of the rotor and formed by superimposed winding layers having a plurality of turns wound around the pertaining pole and containing conductors extending parallel to the rotor axis, and a heat pipe structure carried by each pole, said heat pipe structure having an evaporator end embedded in said winding, a condenser end projecting into the path of flow of said coolant gas and a portion of said heat pipe structure between said ends extending laterally across a plurality of said conductors with said evaporator end more remote than said condensor end from the axis of rotation of the rotor thereby permitting centrifugal force to transfer condensed fluid in the heat pipe from the condenser end to the evaporator end.

2. A machine according to claim 1, wherein each heat pipe structure is positioned between adjacent layers of said winding in a plane parallel to the axially-extending medial plane of the pertaining salient pole.

3. A machine according to claim 1, wherein each heat pipe structure extends across a plurality of said layers and lies in a plane perpendicular to the axially-extending medial plane of the pertaining salient pole.

4. A machine according to claim 2, wherein the condenser ends of the heat pipe structure on adjacent poles are located in a common gas-coolant passageway defined between the rotor and the windings of the adjacent poles.

* * * * *